Oct. 20, 1970    J. R. DENNER    3,535,046

INK DENSITY MEASURING APPARATUS

Filed Dec. 4, 1967    7 Sheets-Sheet 1

Inventor
James Railton Denner

By Sandoe, Neill, Schottler + Wilkinson
Attorneys

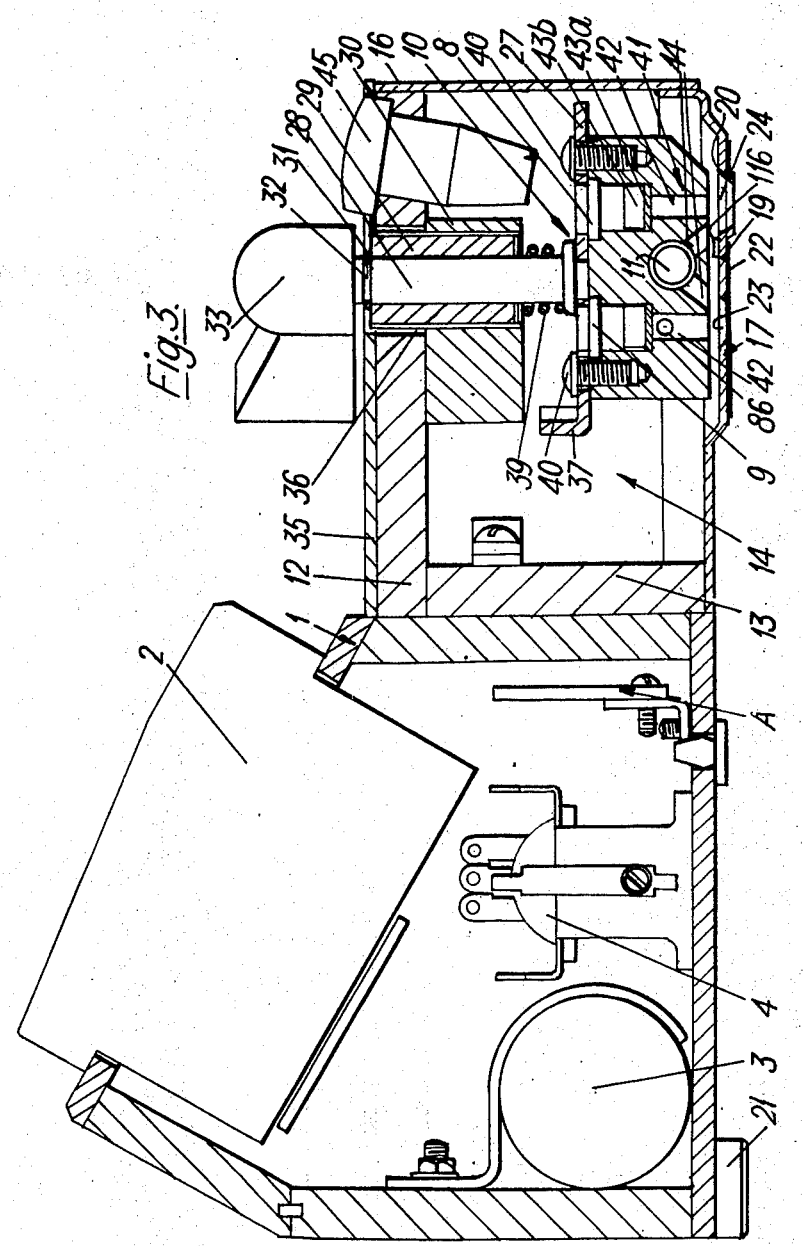

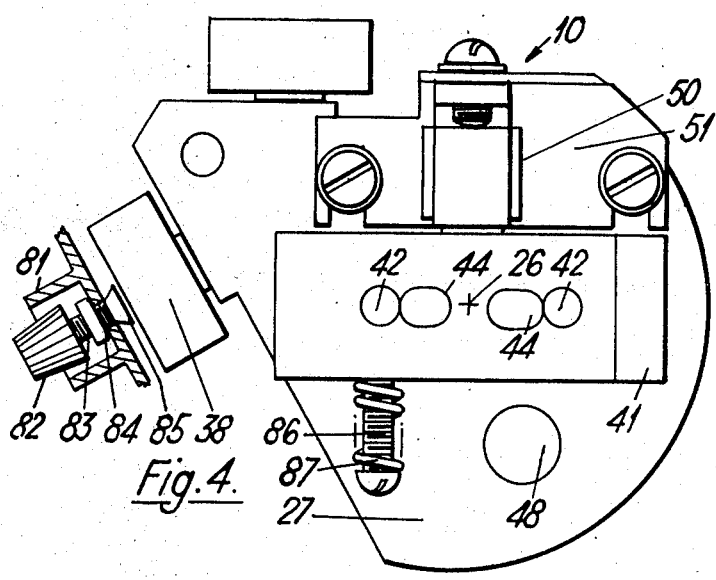
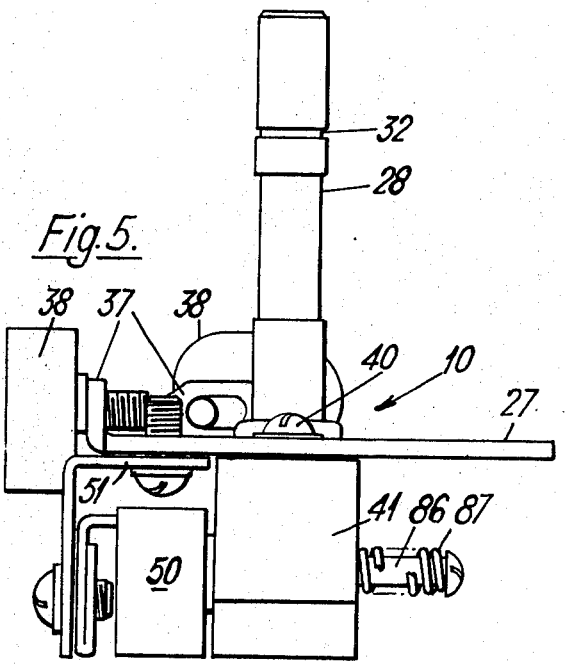

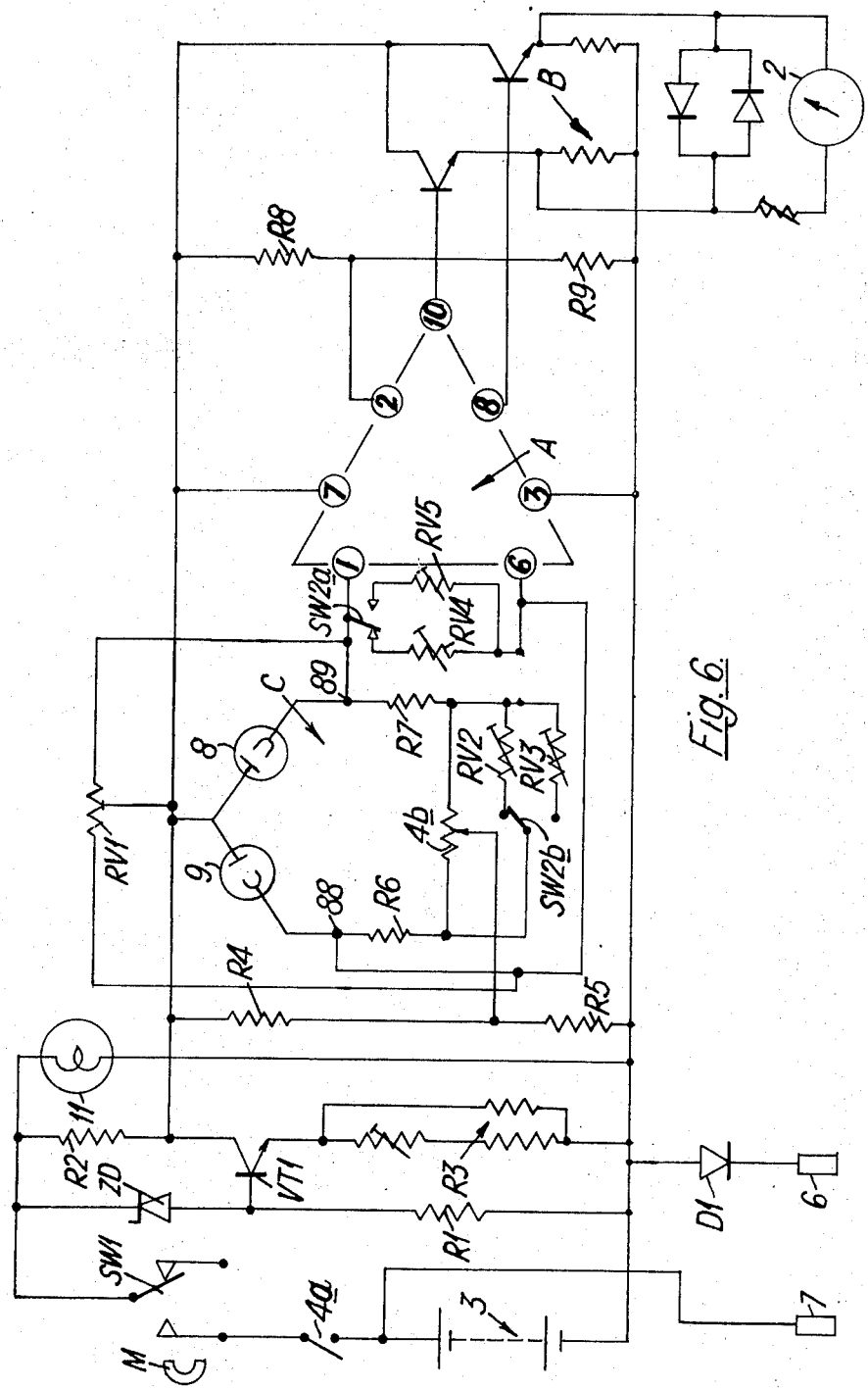

Oct. 20, 1970 J. R. DENNER 3,535,046
INK DENSITY MEASURING APPARATUS
Filed Dec. 4, 1967 7 Sheets-Sheet 6

Inventor
James Railton Denner
By
Sandoe, Hill, Schittler & Wibetrum
Attorneys

United States Patent Office 3,535,046
Patented Oct. 20, 1970

3,535,046
INK DENSITY MEASURING APPARATUS
James Railton Denner, Shepton Mallet, England, assignor to W. H. Howson Limited, Seaforth, Leeds, England, a company of Great Britain and Northern Ireland
Filed Dec. 4, 1967, Ser. No. 687,550
Claims priority, application Great Britain, Dec. 6, 1966, 54,580/66; Feb. 10, 1967, 6,531/67; Apr. 28, 1967, 19,788/67
Int. Cl. G01n 21/48
U.S. Cl. 356—212          7 Claims

ABSTRACT OF THE DISCLOSURE

A particular embodiment of device used in the control of ink densities in printing has two photoresistive cells in a balanced bridge circuit, the output of which appears in a meter. Equal illumination is given to test areas "seen" by the cells by a single lamp.

---

A carriage in the device is movable so that the cells "see" at one time either two comparison printed samples (this is called the "balance" condition) or one comparison and one test sample (this is called the "read" condition); if the test sample is printed the same as the comparison there is no deviation from the reading set up while the carirage was in the former position.

Registration of the device onto the test sample is achieved by viewing the sample through an aperture in the device which actually defines the test area; thus what is seen there is exactly what is tested. Viewing is possible only while the device is in the "balance" condition, and movement of the carriage prevents ambient light reaching the test sample through the viewing passage.

Precise adjustments, both electrical and optical, are provided for in the structure and the electric circuits of the device.

Other specific embodiments, and general modifications, are also described.

The device is powered by a rechargeable battery, and a storage panel is described which automatically recharges devices held by it.

BACKGROUND OF THE INVENTION

It is necessary for a printer to know whether he is laying down ink at a correct density when he is printing, in the interest of economy and more particularly, in the case of multicolour printing, to ensure a desired balance between various colours.

The usual basic density measuring apparatus consists of a lamp for illuminating the surface to be tested, and a light-collecting organ viewing through a complementary filter the paper tested at a position to receive light from the source after reflection off the paper. Usually, a comparison source is provided and in a simple prior measuring apparatus a continuously graded wedge is moved in front of the comparison source until the two match. This depends on visual and manual accuracy and special wedges have to be provided, and the light sources have to be accurately matched.

Another problem with such devices, which need to examine a particular portion of a test sample, is the difficulty of positioning the light receiving probe accurately over the part desired. Attempts have been made with prior devices to meet this by not placing the probe directly over the sample, i.e. not in contact with it, but leaving an arch over the part being sampled and shining a light through the arch. This light at one time acts as the light which has to be reflected from the sample, and as a pointer for the operator who looks through the arch to see that it is in the right place. The difficulty with this arrangement is that ambient light may fall on the sample in addition to the light from the standard source.

In any case, in prior devices, there is a degree of over-refinement, in that the average printer does not want to know in any particular units by how much he is wrong, he wants to know whether he is right or not, and in which direction and by approximately how much he should correct his printing machine.

SUMMARY OF THE INVENTION

The present invention concerns itself with providing means for measuring ink density which is as simple as possible, compatible with accuracy, which can be made compact and robust (for use possibly by the printer actually on the machine) and which can be produced at comparatively low cost.

In the present apparatus which is designed to lessen or remove the human element, the light from the comparison source and the light from the sample being tested are directly compared photoelectrically.

According to the invention 1 provide a device for assessing the density of ink of ink of a given colour printed on a sample comprising means for providing standard illumination at different test areas, two photosensitive cells for receiving light respectively from one of those area, a correctly printed comparison sample and a test sample positioned at the test areas and means for producing relative movement of the cells and the samples whereby, when the illumination is provided, one of the two cells receives light at all times from the comparison sample, and the other receives in one relative position light from the comparison sample and in another relative position from the test sample. When each cell receives light from the comparison samples the device is said to be in its "balance" condition; when they receive light one from a comparison and one from a test sample it is said to be in its "read" condition.

In a preferred embodiment a sighting aperture is additionally provided and means are provided for viewing the test area at which the test sample is to be positioned through the sighting aperture from the outside of the device while the two cells are in their balance condition, the sighting aperture being moved relative to the sample when the device is in its "read" condition so that then no ambient light passes to the test area through the sighting aperture.

The two photo-electric cells are caused to give a balanced output, whereby any given device may have any pair of identical filters inserted one before each of its photoelectric cells on assembly of the device, the device then being used for ink of one band of colour only. In this way, the problems of compensating for different sensitivities of the cells to colours of different inks do not arise.

In a preferred embodiment of the invention, relative movement is induced between a stationary comparison printed sample and movable said photo cells so that the said sample is moved past the photocells can be moved with respect to the sample for either one or both the cells to receive light from the sample. One means for causing this relative movement is rotational movement of a carriage mounting the photo cells and the light sources relative to the sample or alternatively, a relative rectilinear sliding movement between such a carriage and the samples. Such sliding movement may occur with the samples remaining stationary within the device and a carriage moving or vice versa.

It is possible to use a single light source to illuminate both the comparison samples and the test sample. This single light source may be housed within a block in which are formed tubes for directing the light from the source towards the samples and for directing light reflected from these samples to the photoelectric cells.

Also, it is possible to compensate for any difference in plane between the comparison and test samples by mounting the cells and light source so that they are movable together towards or away from the samples. Alternatively or additionally a movable shutter may be provided adjustably to obscure a sample aperture.

Further, magnetic means may be provided to bias the movable carriage towards either one of two limit positions, one being the "balance" position the other being the "read" position.

The present invention provides also a said device used in the control of ink density which has a re-chargeable battery and a panel is provided for the reception of a plurality of these devices, contacts at the outside of the devices being brought into circuit with a charger with the battery when the devices are stored on the panel. The panel may further have means for causing the device to adopt its "balance" position while the devices are received by it, and for ensuring that the light source is switched on as the device is removed from the panel.

DESCRIPTION OF PARTICULAR EMBODIMENTS

Particular embodiments of the invention will now be described with reference to the accompanying drawings wherein:

FIG. 3 is a section on the line 111—111, FIG. 1,

FIGS. 4 and 5 are underneath plan and end views of a part of the embodiment of FIG. 1, FIG. 6 is an electric circuit diagram.

Figure 1:
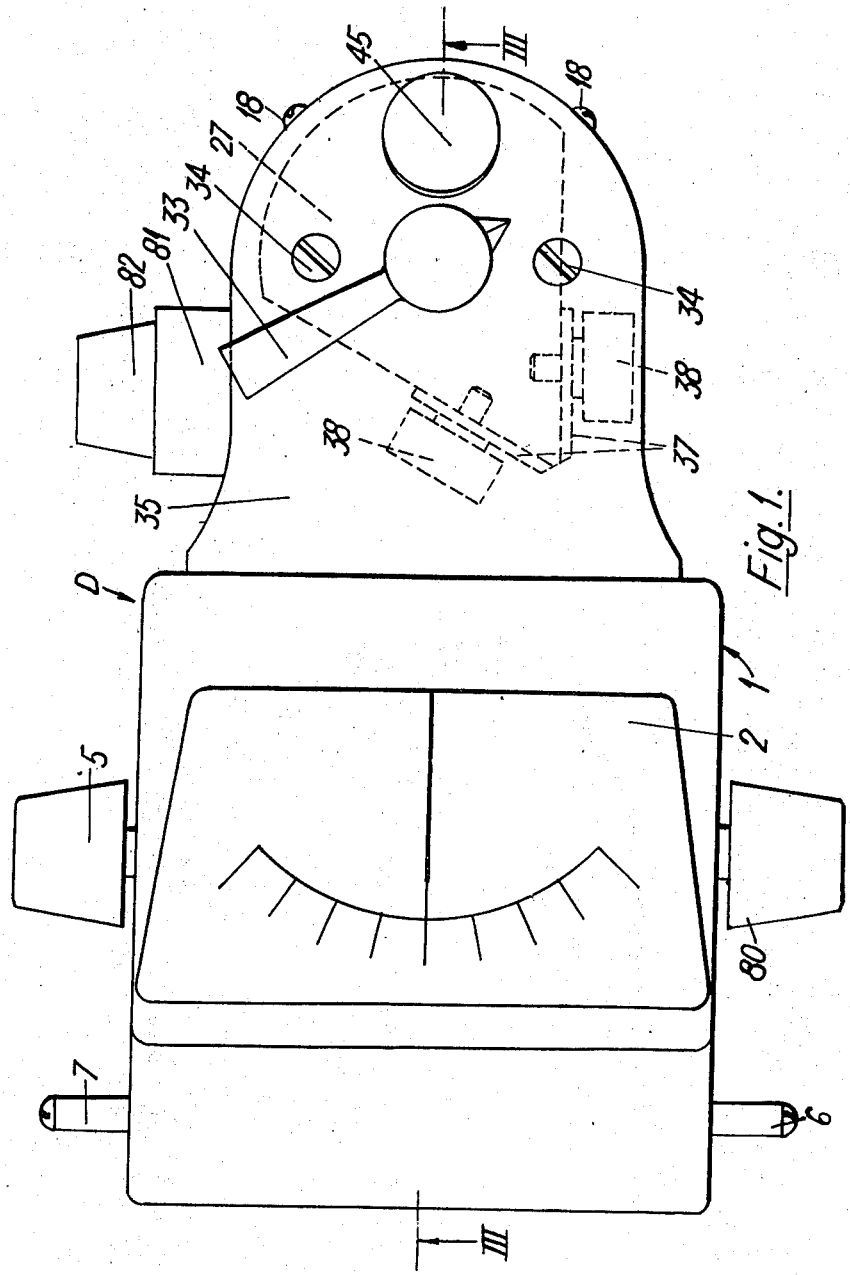
FIG. 1 is a plan view of the device.

The device D has a plastic material casing 1 which mounts a zero-centre microammeter 2 in its roof. Within the casing is provided a rechargeable battery 3 and an on/off switch and variable potentiometer 4 (switch 4a and potentiometer 4b in FIG. 6) having a control knob 5 outside the casing. Leads come from outwardly projecting metal pins 6, 7 through the switch 4 and rectifier D1, to the battery, and a magnetically actuated switch SW1, to be described in more detail later, can switch off the instrument from the pins 6, 7 if switch 4a were not already open. Alternatively a relay could be provided which would achieve the same whenever a charging current is applied ot the pins. The switch also automatically cuts them off (and switches on the light source of the device) in certain circumstances, e.g. when the device is removed from a storage panel or when the charging current is removed from the pins.

The potentiometer 4b is part of a bridge circuit C (FIG. 6) of which the output goes to the microammeter 2, in this case via an amplifying circuit. The other legs of the bridge are two photosensitive cells 8, 9 which are mounted on a pivotally movable carriage 10. In this embodiment the cells are photoresistive cells. Also mounted on the carriage is a single electric light bulb 11 and leads to the cells 8 and 9 and to the light bulb 11 are taken to the carriage from the electrical parts within the casing 1.

A thick plate 12 of plastics material projects outwardly from the front wall of the casing 1 and a plate 13 overlies part of that front wall to form the roof and back respectively of a housing 14 for the movable carriage.

The side and front walls of the housing 14 are formed by a metal casing 15 which here is of welded construction having a U-shaped sheet mild steel side wall 16 and a stamped base 17.

The wall 16 forms a tight fit round the plate 12 and screws 18 secure the part 15 to the plate 12.

The base 17 has a dished part 19 of which an annular nose 20 is coplanar with rubber feet 21 at the back of the floor of the casing 1 so that the whole of the periphery of the nose 20 lies flush on the surface to be tested.

Alternatively, the dished part 19 of the base 17 may have a rim added to it, for example a ring of felt may be stuck to its edge. The resilience of the felt allows accommodation to any unevenness in the surface being tested.

Figure 7:
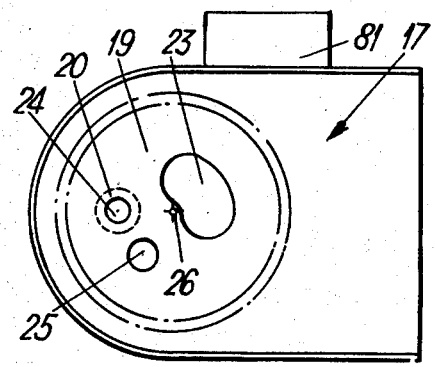
FIG. 7 is an underneath view of part of the embodiment.

On the outer face of the dished part 19 comparison samples of material 22 of a desired ink density can be mounted outside the housing 14, to be viewed through two of three apertures 23, 24, 25 (FIG. 7). The comparison samples are attached so as to be viewed through apertures 23 and 25; through the third aperture, 24, the material actually to be tested is to be examined by the device.

The effective aperture of the kidney-shaped aperture 23 is larger than that of apertures 24, 25, to permit greater latitude in the manufacture of the casing floor 17, or loss of true in the assembly of the stem to the plate 12, without loss of accuracy, because the cell "sees" not the circular edges of an aperture such as 24 or 25 but an indeterminate area of the sample only. The resulting inequality in the amounts of light reaching the two cells 8, 9 from identical samples could be corrected by adjusting the relative width of apertures 23, 24 and 25 (and in fact this is done approximately, since the diameter of apertures 24 and 25 is less than the width of aperture 23), but this does not permit accurately any correction necessary individually as a result of lack of true in the stem assembly. Therefore it is preferred variably to obstruct one bore with the tip of a screw 86 as will be described.

It may be desirable for the sake of economy to substitute for the facility for axial adjustment of the stem 28 a variable shutter at that end of aperture 23 which is diametrically opposed to the aperture 24. Such a shutter (not shown) can be part of a strip pivoted in the casing and moved by the action of a screw rod which engages a nut loosely trapped between lugs at one end of the strip. Movement of the shutter part of the strip across one end of the aperture 23 affects only the balance in the "balance" position of the carriage, and the calibrating effect is the same as that which will be described with reference to the screw 86.

Of course the shutter may be provided additionally in a device in which the block 41 is axially movable.

In order to give light to illuminate the aperture 24 when the carriage is in its "balance" position (so that the sample may be seen through the eyepiece) one side of the block 41 has an open channel cut into it through which the tip of the light bulb 11 projects to throw light sideways from the block into the appropriate region.

A rim may be provided round the edge of the dished part 19 to prevent ambient light reaching the back of comparison samples; if these samples are truly opaque or if the thickness or nature of the test and comparison samples is such that they are pressed against the working surface used for examinations, the rim may be omitted.

An axle for rotational movement of the carriage is a stem 28 riveted to the upper plate 27 of the carriage 10. The stem 28 extends upwardly through a bush 29 which is screw-threadedly borne within a block 30. The stem 28 is trapped within the bush 29 by a circlip 31 in a groove 32 and its upper end, beyond which groove a handle 33 is screw-held onto the stem, which is keyed so that the handle 33 may drive the stem 28 in rotation.

The end of the bush 29 to be nearest the handle 33 has a diametrical groove for engagement by a C-spanner.

The block 30 is secured to the plate 12 by two screws 34 which act also to hold a coloured cover plate 35 to the top of the plate 12. The coloured cover plate 35 has the function of indicating which range of colours of ink is to be measured by the device.

An aperture 36 in the plate 12 and cover plate 35 is of greater diameter than the bush 29, and similarly apertures for receiving screws 34 through plates 12 and 35 are of greater diameter than the screws. The screws 34 are however, screw-threadedly engaged with the block 30. Thus, when the screws 34 are loosened the block 30 may be moved relative to the plate 12 and to the casing 15 in directions parallel to the plate 12.

Rotation of the bush 29 within the block 30 can move the stem 28 axially relative to the cover plate 12. Such movement is effected by the circlip 31 being drawn downwardly onto the end of the bush 29 by the action of a compression spring 39 surrounding the lower part of the stem 28. Thus the carriage 10 is movable not only by virtue of rotation about the axis of rotation 26 the stem 28 but also to a small degree both axially along the stem (i.e. towards and away from the planes at which the comparison and test samples are to be borne) and parallel to those planes.

Figure 2:
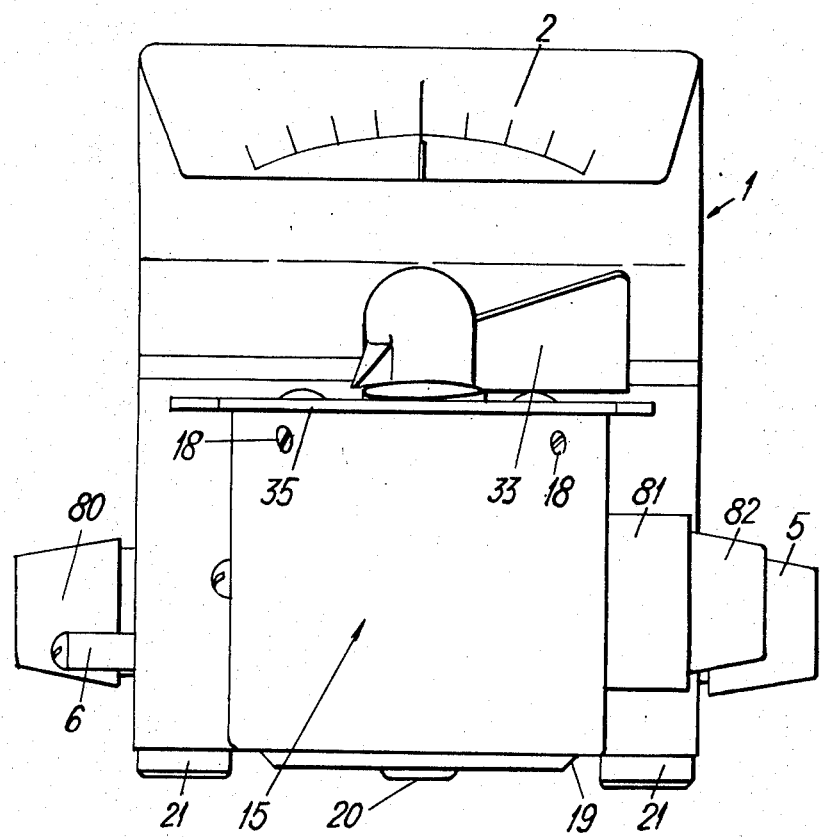
FIG. 2 is an end view of the device of FIG. 1.

The upper plate 27 of the movable carriage 10 is kite-shaped and has at its tail end upturned flanges 37 on each of which is mounted a disc magnet 38. The metal casing 15 is formed of ferromagnetic material so that the magnets 38 are drawn respectively to the side walls 16 so as to hold the kite in one position or another. Below the plate 27 a block 41 is secured by screws 40. The block 41 contains cavities for the reception of the cells 8, 9 and for the colour filters 43a and heat filters 43b mounted in front of them. Tubular bores 42 are directed from the cells 8, 9 towards the apertures 23, 24, 25 in the base 17. Bores 44 are at an angle of approximately 45° to bores 42 and radiate from the electric light bulb 11. Thus light is projected from the electric light bulb 11 down bores 44 and, when the carriage is at the position shown in FIG. 2 (the "read" position), is directed at aperture 24 and at aperture 23, and is reflected from whatever is positioned at those apertures up respective bores 42.

The rims of apertures 23, 24, 25, are bevelled to permit maximum light to enter them from the light source.

In the other limit position of the movement of the carriage 10 (when the other magnet 38 is attracted to the other wall 16 as compared to what is shown in FIG. 1) the two bores 42 are in register with the apertures 25 and 23 and the carriage is in its "balance" position.

In order to sight the position at which a test is to be made, an eyepiece 45 penetrates plates 12 and 35 and points at the aperture 24. A sighting aperture 48 in the plate 27 is in register between the aperture 24 and the eyepiece whenever the carriage 10 is in its "balance" position and then the sample of material to be tested which is at the aperture 24 can be viewed through the eyepiece.

The alignment of the block 41 is such that in the "read" position the bore 42 of the cell 8 should be in central alignment with the aperture 24. In the "balance" position the bore 42 should have moved to a position such that its trailing edge is just inside the edge of the aperture 25 nearest to the aperture 24.

When thus aligned, the bore 42 will start to move across the edge of the aperture 25 in the direction of the aperture 24 as soon as the adjuster knob is screwed in from its initial fully out position.

To obtain this alignment, the whole carriage assembly may be shifted when the two screws 34 are loosened slightly.

Electric light bulb 11 is mounted in a holder 50 which is rotatable on a bracket 51 depending from the plate 27.

To one side wall of the casing 15 there is fast a collar 81, and a knob 82 projects from within the collar. A screw rod 83 is fast with the knob and engages a screw-threaded aperture in a plate 84 attached to the side wall. A plug 85 rotatably borne on the end of the rod is of ferromagnetic material and is attractive to one of the magnets 38, when the carriage 10 is in the position relative to it shown in FIG. 4. By rotation of the knob 82 and hence of the screw rod 83 the limit position of the carriage, wherein the magnet abuts the plug, can be adjusted.

A further adjusted is provided by a screw 86 engaging a screw-threaded bore in the block 41 which intersects one of bores 42 (the bore 42 through which the kidney-shaped aperture 23 is viewed). The screw is retained against unwanted movement by a spring 87. The tip of the screw can be made to project into the bore 42, in a workship adjustment, the reason for which will be described.

Parts of the electrical equipment have already been described. A fuller description of the circuitry involved will now be given with reference to FIG. 6.

The potential of the battery 3 is applied when the switch SW1 is closed, across a voltage stabilising arrangement comprising a Zener diode ZD and a resistor R1. The potential across this is applied to the bulb 11, and also to a voltage-dropping potentiometer arrangement comprising resistor R2 and composite semivariable resistor R3 and a transistor VT1. The transistor VT1 applies a greater voltage across the amplifier A if the voltage across the lamp 11 drops thereby providing more gain to compensate for the lower output of the lamp.

The output is taken across another potentiometer comprising equal resistors R4 and R5 and also to the input-side power terminals 3, 7, of an amplifier A, which in the present embodiment is an integrated circuit amplifier (CA 3000, manufactured by R.C.A.). The output of the potentiometer R2, R3, is also taken across a potentiometer comprising equal resistors R8 and R9, the voltage from the middle of which is applied across output-side power terminal 2, of the amplifier. Also the output of the potentiometer R2, R3 is taken to a conventional current-amplifying circuit generally designated B.

The bridge circuit C has, apart from the cells 8, 9 equal resistors R6 and R7 the balance between which being trimmed by the variable potentiometer 4b. The output of the bridge is taken direct from points 88, 89 to the signal input terminals 1, 6 of the amplifier A.

A semivariable potentiometer RV1 adjusts the balance between the photocells 8, 9, and a semivariable resistor RV2 can be permanently in circuit across the variable potentiometer 4b, for adjustment of the sensitivity of the bridge.

In the present embodiment, however, additional controls are added, for use when very light colours are being examined. In such a use the resistance of the photo cells will be very low, and the resistors R6 and R7, will be relatively too high in value: this leads to insensitivity and coarseness in the performance of the balance control 4b, as well as introducing the possibility of inaccuracy in the bridge. Therefore, for use with light colours, a shunt consisting of an alternative, low resistance, variable resistor RV3 can be brought in by gang b of a switch SW2, operated by knob 80, for rebalancing the bridge.

Gang a of switch SW2 shunts one of two semivariable resistors RV4 RV5 across the signal input terminals 1, 6, to ensure equal response by the meter 2 to equal percentage deviations in both dark and light test samples: the setting of each of these variable resistors determines the relative gain in the amplifying circuits as a whole.

Figure 8:
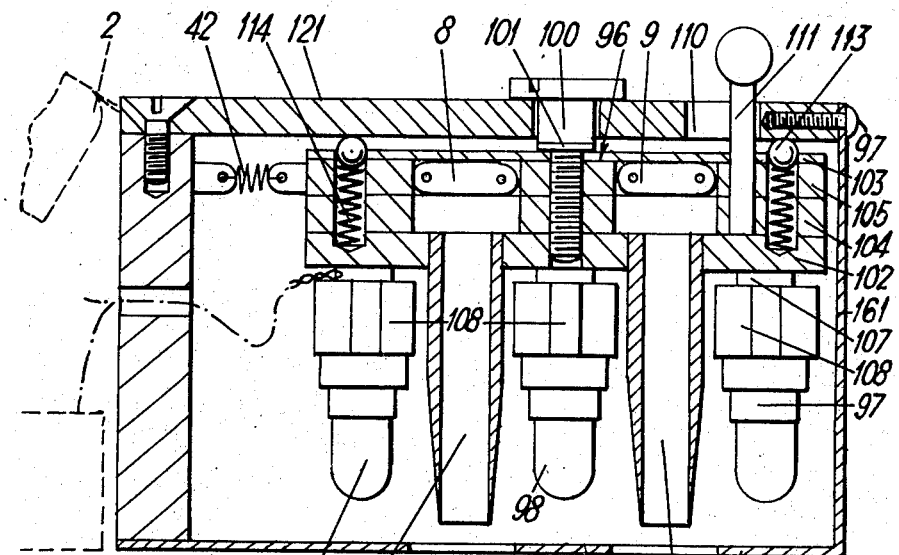
FIG. 8 is a section analogous to that of FIG. 3 but of a second embodiment.

The mechanical parts of a much less sophisticated embodiment are illustrated in FIG. 8; many of these are the same as in the first embodiment, and are given the same reference numbers.

The floor of the device is a flat metal plate 95 having apertures corresponding to apertures 23, 24 and 25.

The cover of the device is a cover plate 121 removably secured at the top of the end wall of the casing and to the top of side walls 161.

Within the casing there is rotatably mounted a carriage 96 bearing three light sources 97, 98, 99 and two photosensitive cells 8, 9. The pivotal mounting is achieved by a wide headed screw 100 passing through the cover plate 121, and rotatable relative to it, and passing into a screw-threaded bore through the carriage 96, being locked there by a locking washer 101.

The carriage 96 has a body made of a lower plate 102, a top plate 103, and intermediate plates 104 and 105. Fast with the lower plate 102 are a pair of downwardly protruding tubes 106, and the bases 107 of sockets 108 for the three light sources 97, 98, 99. The arrangement is such that the light sources 97, 98 and 99 and the tubes 106 are in a single straight line which passes through the axis of rotation of the carriage.

The intermediate layers 104, 105 of the body of the carriage 96 have apertures in them which register with the upper end of the tubes 106 are for receiving a single light-passing filter and a heat filter. The cells 8, 9 are housed and retained in the aperture of the upper of the two intermediate plates, 105 and can receive light passing up the tubes 106 and through the filters.

The plate 103 is of an opaque material to shield photoelectric cells 8, 9, from any light received from above the carriage.

The cover plate 121 has a slot 110 through which projects the stem 111 of a control lever which is anchored in the body of the carriage 96 and which by rotational movement about the axis formed by the screw 100 can change the angular relationship of the carriage and the casing. The top plate 103 of the carriage is marked so that the position reached by the carriage can be read through the slot 110.

A tension spring 112 acts between an anchor point on the end wall of the casing 1 and the projecting arm on the plate 105 to bias the carriage to rotate in a clockwise direction. A latch (not shown) is formed by a radially projecting downwardly obliquely angled plate which can lie in the path of a plunger which emerges through an aperture in the base plate 95. The effect of the latch device is that when the device is lifted from a surface, the plunger is urged downwardly by a spring and the catch member can pass the line of action of the plunger. The spring 112 then brings the carriage clockwise till the stem 111 hits the end of the slot 110, and the carriage is in its "balance" position.

If, however, the device is placed with its base plate 95 on a flat surface, the plunger is pushed upwardly and the catch can act to retain the carriage 96 in its "read" position and the stem 111 is at the other end of the slot 110.

Balls 113 are urged upwardly by springs 114 from the carriage 96 to run on the undersurface of the cover plate 121 and steady the carriage during rotational movements.

The purpose of describing this embodiment, which is in many respects inferior to the first embodiment, is to show that it is not essential to use a single light source.

When this device is placed on a surface, the surface can be illuminated through the apertures by the lamps 97 to 99 and light reflected from the surface passed to the photoelectric cells 8, 9 through the tubes 106. However material below one of the apertures is illuminated only by lamps 97 and 98 and light reflected from it goes only to photoelectric cell 9, while material underneath the other aperture is illuminated only by lamps 98 and 99 and light reflected from it goes only to photoelectric cell 8, and this is so whatever the rotational position of the carriage 96 relative to the casing.

Figure 9:
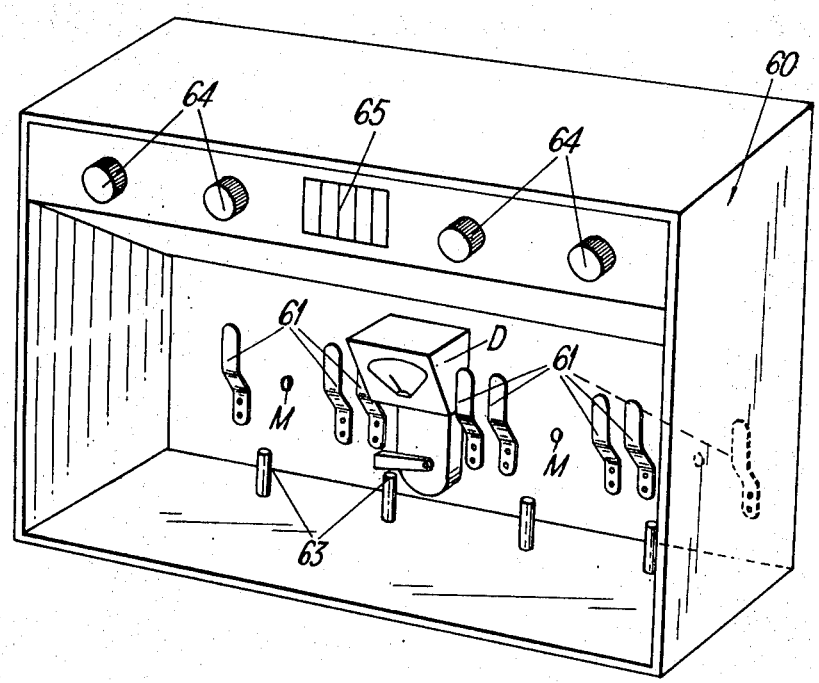
FIG. 9 is a perspective view of a storage panel.

Referring now to FIG. 9, a panel 60 for the storage of devices D when not in use has four pairs of hook-like metal strips 61 which act to support the devices by means of their pins 6, 7 and at the same time supply charging electric current to the battery 3 of the device. Spring posts 63 in the floor of the panel act on one arm of the handle 33 to cause the carriage of the device to adopt a "balance" position when a device is stored.

Panel 60 has indicator lights 64 to show that charging is occurring and a control and fuse board 65.

Permanent magnets M are mounted in the backboard of the panel in such a position as to affect the switch SW1 and bring it to its open position whenever the devices D are stored on the panel. Then, charging of the battery can occur, back-charging being prevented by D1. As soon as the device D is removed from the board the switch SW1 reverts to its closed condition and the lamp 11 is thus switched on. Since the device is in its "balance" condition the cells 8 and 9 are then receiving light, each from its comparison sample, and the cells, as well as the battery and the rest of the circuitry, will usually have had time, while the device is being carried from the panel to its place of use, to have come to their stable condition (photoresistive cells such as these have a not inconsiderable "rise time" when they are exposed to light, during which their resistance approaches the fixed and correct value for that amount of illumination).

A complete set of devices for use in multicolour printing will usually consist of four devices, appropriately equipped with plain or coloured filters for testing black, yellow, red and blue inks.

Before use, a sample is printed with the printing ink of which the weight is to be tested at a correct density of printing ink. The device has, when it is made, filters inserted in front of the cells 8, 9 which are appropriate to the testing of that printing ink (the filters are of a colour complementary to that of the printing ink) and the device is intended to be used only with ink of that or a very similar colour. The filters could be replaced by dismantling and reassembling the device but this is not intended.

The sample is applied to a self-adhesive disc 22 which can be applied by its self-adhesive face to the underface of the dished part 19, so as to expose the correctly printed sample, which constitutes the comparison samples, to each of the apertures 23 and 25. The other aperture 24 registers with an aperture made in the disc.

In the balance condition of the second embodiment each tube 106 and photocell 8 and 9 are viewing identical samples, and these samples are correct, or deviate from a desired density by a precisely known amount. The material to be tested, the test sample, is placed under the aperture 24, and the carriage moved to its "read" position. If the test sample corresponds to the comparison sample there will be no change in the relative condition of the two photocells. Then, when the carriage is moved to the "read" position, divergence of the microammeter from the null point indicates an error in applying ink to the tested sample, and the direction of the error is indicated by the direction in which the needle diverges from the zero point. This test could be made quantitative, but only with difficulty, and it is not primarily intended to be quantitative but to indicate to the printer merely whether he is applying too much or too little ink, since it is such a simple matter with this device to repeat the test after adjustments have been made to the printing mechanism. It is intended, however, that a given percentage variation in intensity as between a comparison and test sample of any colour shall give an approximately equal reading on the meter.

The setting up for use of the first embodiment is much more sophisticated than the setting up of the second because care is taken to eliminate any errors which might arise from the test and the comparison samples being in different planes (below apertures 24 and 23, respectively), and which might arise from any lack of true or balance in any of the parts. The comparison samples at the paired apertures 25 and 23 (and which are seen by the cells when the device is in its "balance" position) are both in the same plane and therefore if the carriage were moved without precautions to examining samples in different planes there would be a loss of accuracy: to a certain extent this is provided for my making aperture 24 slightly smaller than aperture 25, but this gives no facility for individual adjustment.

Other sources of error or lack of balance are these:

(i) inequality of the response curves of the cells 8 and 9 (they are chosen however to balance closely at two given illumination levels and with the colour filters actually used).
(ii) inequality of the resistors R6 and R7.
(iii) mechanical lack of true in the base plate 17 (this is intended to be a cheaply produced pressed part and not necessarily very accurate).
(iv) eccentricity of or relative to the stem 28.
(v) lack of true in the making of the bores 42, 44 in the block 41.
(vi) assymetry of the illumination given by lamp 11.

The optical and electrical adjustment of the device will now be described, and the measures taken to deal with these difficulties will be explained.

As a result of an electrical test during assembly, it is known that with the balance control 4b in mid-position, the meter 2 will read zero when the resistances of the cells 8 and 9 are equal, that is, when the amount of light received by the cells are equal. The sensitivity control RV2 will also have been set to a level convenient for the optical adjustments to be made. It is essential that neither the balance range preset nor the gain preset RV4 be moved after assembly until optical balance has been established. Any failure of the complete instrument to balance up to this stage must be corrected by optical adjustment only.

The optical adjustments consist of:

(a) adjustment of the level of the block 41 so that when reading identical material to the internal sample, coincidence of zeros on "balance" and "read" positions occurs within the range of the front adjuster 82 and
(b) adjustment of the screw 86 in the bore 42 (and if necessary the bulb position) so that optical balance is established. The meter will then read zero when the balance control 4(b) is in midposition, and rotation of the balance control will give an equal range of pointer travel on both sides of zero when in the "balance" position with the sample fitted.

A sample is prepared as for the second embodiment, but is divided into two parts. One part is secured to the disc 22, and the other is reserved.

The sample first part must cover both the aperture 25 and the kidney-shaped aperture 23 completely, without any of the white backing material showing in either aperture.

Then, switch to "balance" position and sight the device, by means of the eyepiece 45, so that the aperture 24 is on the second part of the sample, of the same density as the comparison sample. Switch to "read" and adjust the balance knob 5 so that the pointer of the meter lies at zero. If necessary, adjust the position of the screw 86 in the bore 42 (accessible through a hole in the side of the cover when in the "read" position only) so that this can be achieved. Any inequalities due to (iv) and (v) have now been dealt with. Now, the difference in plane, and point (vi) are to be dealt with.

Ensure that the adjuster knob 82 is fully unscrewed. Switch to the "balance" position, when the pointer should assume a position on the left-hand (negative) side of the scale of the meter. Screw in the adjuster knob 82 1½ turns and observe on which side of zero the pointer then lies.

If the pointer of the meter lies at zero, no further adjustment of block height is necessary. If still to the left of zero, lower the block slightly by screwing down the bush 29 and repeat. If pointer has moved, or lies initially, to the right of zero (positive reading) then either the position of the lamp needs to be altered so as to increase the illumination at the aperture 23 relative to that at the aperture 24 or the alignment of the block and front cover is not correct.

The above operations should be repeated until the pointer lies at zero in both "balance" and "read" positions ("zero coincidence") with the adjuster knob 82 screwed in 1½ turns from its fully out position.

The effect of axial movement of the bush 29 is to cause displacement of the pool of light cast down the bores 44 to be slightly out of line with the aperture 25, so that some of the light will be reflected from the edge of the aperture (which will usually be black) in addition to being reflected from any sample in it. When the amount of this displacement is sufficient to cancel out the inequality arising from the difference in distance of the two samples from their respective photocells, then, if the block is made symmetrically (which it is) and the angle of the bores 44 is approximately 45°, the same axial shift will give equality also as between the two comparison samples at the other two apertures.

This is checked, as described above, by bringing the carriage to the "balance" position.

Now rotate the balance control knob 5 and observe whether the range of travel of the pointer is equal on both sides of zero. If not, and the pointer lies on the negative side of zero at midrange, unscrew the screw 86. The pointer will travel to the right (i.e. positive) as the screw is moved out of the bore. Movement of the pointer will cease when the end of the screw has cleared the bore of the light duct, and if further shift of the pointer is required, then the position of lamp 11 will require adjustment.

Gross imbalance can be corrected by bodily movements of the block 30.

The prime purpose however, of the bodily movement of the block 30 (carrying with it the carriage 10) is to permit of visual alignment of the apertures 23, 24, 25, with the apertures in the block 41 since the pressing 17 is intended to be a cheap part which will therefore not necessarily be vary accurately made, dealing thus with (iii) above.

The device is now in a condition of "optical balance." Electrical balancing steps are now started.

Adjustment of sensitivity (by resistor RV3 and RV5) is achieved using a special sample card for the appropriate colour. This card will contain three patches of colour and will have marked on it the difference in reading between the two outer patches which a correctly adjusted instrument will indicate.

Next, point (i) above is dealt with. This is achieved by substituting for the battery 3 a voltage source of variable potential, and adjusting RV1 so that the meter 2 reads zero at voltage ranges ±20% of the voltage actually to be used.

Then the control 4b is deliberately misset, to give a nearly full scale deflection of the meter and again voltage is varied, and RV1 adjusted, until there is no variation in that reading with change of voltage.

With all adjustments correctly made, the pointer of the meter will not shift from zero when so set by the potentionmeter 4b and the supply voltage is varied. It will also remain within ±2 units of both −20 and +20 (when so set) as the supply voltage is varied. The balance knob 5 will produce an equal range of pointer travel on each side of zero.

At this stage, a final check should be made on sensitivity, using the procedure mentioned earlier. The instrument is then ready for final test.

The action of the adjuster knob 82 depends on the cell 8 being caused to "see" an edge of the aperture 24. Since this is black and of different reflectivity than the second part of the sample usually this causes a change in the amount of light received by the cell 8. If however the sample were dull black, there might not be sufficient contrast between it and the edge and it may be desirable to provide a projection 116 (FIG. 3) prevent light from the bore 44 reaching that edge and hence cast a shadow across it (but not across the sample). Thus increased contrast would be provided.

The adjustments which have to be carried out by the user are extremely simple. The two-part sample is sent out with the device. When the device is to be used, the carriage is moved to the read position (the first part of the sample then being under apertures 23 and 25) and the knob 5 adjusted until a balanced (zero) reading is obtained on the meter. The carriage is then brought to its "read" position where, if correctly set, a zero reading will also be given because of the identicality of the comparison and test samples. If the reading is not zero, the knob 82 is adjusted until it is. Any adjustment of this knob should be followed by checking that the device still reads zero in the balanced position.

In devices where the changeover switch SW2 is provided, two such special samples, one of light and one of dark shade will be provided, and the above described simple adjustment be performed on the sample more closely approximating to the material to be tested and with the switch SW2 in the appropriate condition.

When the device is used, a comparison sample is printed at the desired ink density and is secured by a disc 22 to obscure apertures 23 and 25: the nose 20 protrudes through the disc. A test sample is taken from the printing machine and placed on a table. The device in its balance condition is brought to the table and by viewing through the eyepiece 45 the aperture 24 is placed exactly on the part to be examined. Without moving the device, the handle 33 is then moved and a reading is given on the meter. If it is zero the test sample is correctly printed. If it is not, the direction of deviation of the meter and its amount will tell whether the ink is too dense or too sparse and, approximately, by what percentage. The printer takes the appropriate remedial action on the printing machine and retests.

It is possible to embody the invention in a device in which the samples move relative to the photoelectric cells and light sources fast with the casing of the device, either in rotation or rectilinear movement, or to embody the invention in a device in which the carriage is movable within the casing and relative to static samples but in rectilinear motion.

In a further embodiment with a rotating carriage, one of the cells (the one which is to view a comparison sample only) is mounted on the axis of rotation and does not move in translational movement. The other cell can view two distinct test areas, by virtue of rotation of the carriage; the relative motion of cells and test areas is shown by a change of angle between them.

Also, each aperture which refines a test area may be circular or other shaped, i.e. the kidney-shaped aperture 23 may be replaced by two smaller apertures; then, however, adjustment of the block towards or away from the apertures by means of bush 29 becomes much more critical.

In the embodiment of FIGS. 1 to 7, the angle of the tubes 44 to the tubes 42 is not critical, within the range 40° to 50°. The angles made between the tubes 42, 44, must be equal, however.

I claim:
1. A device for use in the control of ink densities in printing processes by comparing light reflected from a test sample with light reflected from a comparison sample, which device comprises:
   (i) a casing including a wall provided with a first aperture defining a test area in which a first comparison sample is positioned, a second aperture defining a test area in which a second comparison sample is positioned, and a third aperture defining a test area in which a test sample is positioned,
   (ii) means located within the casing providing controlled illumination of the test areas defined by said apertures, and
   (iii) two photosensitive cells located within the casing, the casing and said wall being relatively displaceable between a first position in which one of the cells receives light reflected from the test area defined by the first aperture and the other of the cells receives light reflected from the test area defined by the second aperture and a second position in which one of the cells receives light reflected from the test area defined by the first aperture and the other of the cells receives light reflected from the test area defined by the third aperture.

2. A device according to claim 1 wherein the photosensitive cells and the means providing illumination are borne on a carriage mounted for movement within the casing to provide the relative displacement of the cells and the wall between said first position and said second position.

3. A device according to claim 2, wherein the carriage is mounted for arcuate movement within the casing by being pivotably mounted about an axis perpendicular to said wall.

4. A device according to claim 2, wherein the means providing illumination is a single light source and wherein the source and the cells are accommodated in cavities in a unitary block secured to the carriage, the block including parallel tubes to pass light reflected from the test areas to the cells and additional tubes in the same plane as, and inclined at equal angles in the range of from 40 to 50° to, said parallel tubes to pass light from the light source to the test areas.

5. A device according to claim 4, wherein the block is movable toward or away from the test areas.

6. A device according to claim 1 including means for viewing the test sample from outside the device when said cells and said wall are in said first position, said means comprising a sighting aperture in registry with said third aperture when said cells and said wall are in said first position.

7. A device according to claim 1, wherein the cells are electrically connected to form two legs of a bridge circuit, the device including a current sensitive meter connected to the output of the bridge circuit and a variable potentiometer in the other two legs of the bridge circuit to adjust the output of the bridge circuit to a predetermined value as displayed on the meter when the cells and said wall are in said first position.

References Cited

UNITED STATES PATENTS

| 2,060,957 | 11/1936 | Tarvin et al. | 73—73 |
| 2,084,598 | 6/1937 | Rogers | 356—212 |
| 2,273,356 | 2/1942 | Holven et al. | 356—212 |

FOREIGN PATENTS

| 669,950 | 4/1952 | Great Britain. |

RONALD L. WIBERT, Primary Examiner

ORVILLE B. CHEW II, Assistant Examiner

U.S. Cl. X.R.

250—210, 219